(No Model.)
J. J. KUCK.
KETTLE.
No. 523,532. Patented July 24, 1894.
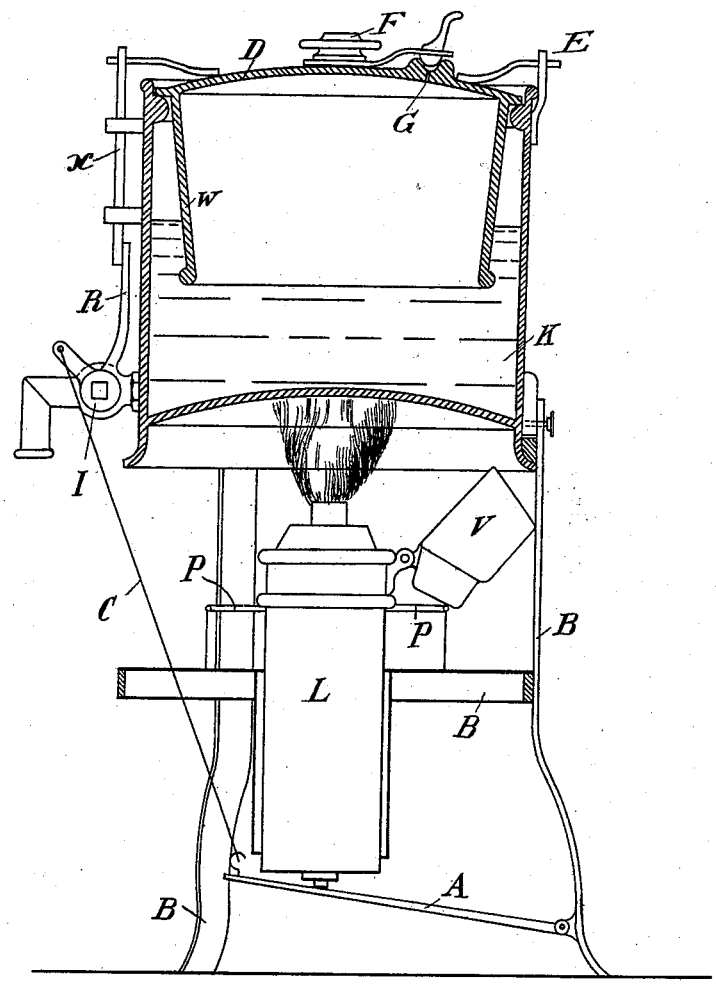
Witnesses.
Walter E. Allen.
Sadie Allen.
Inventor.
John Joseph Kuck
By Knight Bros
Attorneys.

UNITED STATES PATENT OFFICE.

JOHN JOSEPH KUCK, OF HAMBURG, GERMANY.

KETTLE.

SPECIFICATION forming part of Letters Patent No. 523,532, dated July 24, 1894.

Application filed October 2, 1893. Serial No. 487,045. (No model.)

*To all whom it may concern:*

Be it known that I, JOHN JOSEPH KUCK, of Hamburg, German Empire, have invented a new or Improved Kettle, of which the following is a specification, reference being had therein to the accompanying drawing.

This invention relates to a new or improved kettle and its object is to provide means for automatically opening a valve or tap and allowing the water to make its exit when the boiling point has been reached. Such a kettle is especially useful for preparing infusions of tea, coffee and the like, the water from the kettle being caused to flow into the vessel in which the infusion is to be prepared.

The accompanying drawing, which represents a vertical section of the improved kettle, illustrates in what manner this invention may be carried into effect.

The kettle is heated by a lamp which is lowered and extinguished when the valve on the exit pipe is automatically opened.

The kettle consists of a suitably shaped vessel K mounted upon a stand B and furnished with a loosely fitting lid D. The lid D is formed with a projecting rim or flange W the lower edge of which comes below the water line. As a consequence the greater part of the steam evolved from the water accumulates within the upper part of the lid, and upon a certain pressure being attained the lid is lifted from its seat. The lid is jointed by the hook or hinge E to one side of the vessel and is provided at its opposite side with a projecting finger or bracket carrying the vertically sliding bolt X. The lower end of the bolt X when in its lowest position engages with the longer arm of a bell crank lever R which forms the handle of the exit valve I.

The shorter arm of the lever R is connected by a cord, wire or rod C to a hinged flap A which supports the lamp L. At the highest position of the lamp L the counter-weighted extinguishing cap V falls back and is supported by the bracket or collar P. Upon the steam from the water in the vessel K attaining the necessary pressure the lid D is raised from its seat, carrying with it the bolt X and releasing the bell crank lever R. The weight of the lamp L which at once commences to descend, causes the rotation of the lever R thus opening the valve I and allowing the exit of the water. The cap V is tilted forward by the bracket P during the descent of the lamp and falls over the wick and extinguishes the flame.

The lid D is provided with a knob or handle F and a small hole G which may be fitted with a pressure or escape valve. This hole is of sufficient proportions to permit the escape of steam until the boiling point is reached, when the steam is generated too rapidly to escape by the hole G and consequently raises the lid.

What I claim, and desire to secure by Letters Patent of the United States, is—

1. In a kettle or water heating device, a movable hinged, and vented steam holding cover, in combination with a tripping bolt and discharge valve and means for automatically opening said valve.

2. In a kettle or hot water heating device, the combination of a vertically movable lamp, a hinged platform supporting said lamp, a valve operating rod connecting said platform with the discharge valve of the kettle, means for keeping the discharge valve normally closed and an extinguisher operated by the fall of said lamp.

3. The combination in a water heating device, of a movable steam actuated cover, a tripping bolt, a discharge valve and a weighted platform for opening said valve.

In witness whereof I have hereunto set my hand in presence of two witnesses.

JOHN JOSEPH KUCK.

Witnesses:
PAUL FISCHER,
JOHN SALOUSKY.